United States Patent

Suzuki

[11] Patent Number: 5,127,889
[45] Date of Patent: Jul. 7, 1992

[54] DIFFERENTIAL DEVICE FOR VEHICLE

[75] Inventor: Yuji Suzuki, Saitama, Japan
[73] Assignee: Diesel Kiki Co., Ltd., Tokyo, Japan
[21] Appl. No.: 551,247
[22] Filed: Jul. 11, 1990

[30] Foreign Application Priority Data

Jul. 14, 1989 [JP] Japan .................. 1-180432

[51] Int. Cl.⁵ .................................. F16H 1/38
[52] U.S. Cl. .......................... 475/227; 475/333
[58] Field of Search ........... 475/226, 227, 228, 333, 475/346

[56] References Cited

U.S. PATENT DOCUMENTS

| | | |
|---|---|---|
| 2,203,683 | 6/1940 | Frederickson . |
| 2,462,000 | 2/1949 | Randall ............................ 475/227 |
| 3,875,824 | 4/1975 | Benjamin ..................... 475/227 X |
| 4,191,071 | 3/1980 | Gleasman et al. . |
| 4,491,036 | 1/1985 | Stritzel . |
| 4,512,211 | 4/1985 | Stritzel . |
| 4,724,721 | 2/1988 | Gleasman et al. . |
| 4,776,237 | 10/1988 | Premiski et al. ............... 475/346 X |
| 4,878,400 | 11/1989 | Kimura et al. .................... 475/227 |
| 4,890,511 | 1/1990 | Pedersen ........................ 475/227 X |
| 4,926,711 | 5/1990 | Arakawa ........................... 475/227 |
| 4,954,122 | 9/1990 | Nakao et al. .................... 475/227 X |

FOREIGN PATENT DOCUMENTS

WO86/04127 7/1986 World Int. Prop. O. .

Primary Examiner—Richard Lorence
Assistant Examiner—Benjamin Levi

[57] ABSTRACT

A differential device for a vehicle includes a pair of shafts extending into a housing, a pair of side gears connected respectively to the shafts, and at least one pair of element gears having respective screw gear portions meshing with respective screw gear portions of the side gears. The element gears have respective coupling gear portions in mesh with each other. The pair of element gears are received in an opening formed in the housing. Each of the element gears is rotatably supported on a journal pin which is removably supported at its opposite ends on a pair of opposed receiving surfaces respectively defining the opposed ends of the opening which are spaced from each other in a direction of the periphery of the housing. A friction-adjusting washer is interposed between the end face of the element gear and the receiving surface.

1 Claim, 2 Drawing Sheets

DIFFERENTIAL DEVICE FOR VEHICLE

BACKGROUND OF THE INVENTION

This invention relates to a differential device for use in a vehicle.

In differential devices as disclosed in U.S. Pat. Nos. 4,191,071, 4,491,036 and 4,512,211, a differential function is limited by frictions between the component parts, so that a drive torque applied to that wheel subjected to a larger surface resistance can be made greater than a drive torque applied to that wheel subjected to a smaller surface resistance. Here, the surface resistance means $\mu \cdot W$ where $\mu$ represents a coefficient of friction between the road surface and the tire, and W represents a load applied to the tire.

The above conventional differential device comprises a housing to which the torque is transmitted from an engine, and a pair of shafts connected to respective wheels and extending into the housing. The pair of shafts are axially disposed on an axis of rotation of the housing, and one ends of the two shafts are disposed in spaced, opposed relation to each other within the housing. A pair of side gears are connected respectively to the one ends of the two shafts by splines, and therefore a transmission of rotation between each shaft and its mating side gear is achieved. A screw gear portion is formed on the outer periphery of the side gear.

Three openings are formed in the housing and are spaced at equal intervals in the direction of the circumference of the housing. A pair of element gears are rotatably supported in each of these openings. More specifically, a pair of journal pins are removably supported at their opposite ends on the opposed end surfaces of each opening spaced from each other circumferentially of the housing, and the pair of element gears are rotatably mounted on the journal pins, respectively. The axis of rotation of the element gear perpendicularly intersects the axis of rotation of the housing. Each element gear has a screw gear portion and coupling gear portions. The three element gears disposed on one side portion of the housing are arranged around the mating side gear at equal intervals, and the screw gear portions of these element gears are in mesh with the screw gear portion of this side gear. The screw gear portions of the other three element gears disposed on the other side portion of the housing are also in mesh with the screw gear portion of the other side gear. The coupling gear portions of the pair of element gears are in mesh with each other. The differential gear mechanism is constituted by the above intermeshing between the side gears and the element gears and the above intermeshing between the element gears.

In the above conventional differential device (particularly, the device shown in FIG. 4 of U.S. Pat. No. 4,491,036), a washer is interposed between the pair of side gears, and a washer is interposed between each side gear and the housing. In the designing of the differential device, these washers serve to determine the magnitude of the friction between the housing and the side gear as well as the magnitude of the friction between the two side gears, and therefore serve to determine the degree of limiting the differential function of the differential device, thereby performing the function of determining the maximum value of the distribution ratio of the above drive torque.

In the above conventional differential device, when the maximum value of the drive torque distribution ratio is to be changed or adjusted to the optimum value after assembling the differential device, it is necessary to disassemble the differential gear mechanism, to remove the same from the housing, to exchange the washers, and then to again assemble the differential gear mechanism and to mount the same on the housing. Even when only the washer interposed between one side gear and the housing is to be exchanged, it is necessary to remove, from the housing, this side gear, the three element gears in mesh with this side gear, and the shaft spline-connected to this side gear.

Thus, it is very cumbersome to exchange the washers in the once-assembled differential device, and therefore the change or adjustment of the maximum value of the drive torque distribution ratio has been difficult.

U.S. Pat. No. 4,724,721 discloses a differential device provided with support plates. The support plates are supported at their opposite ends on circumferentially spaced, opposed end surfaces of corresponding openings formed in a housing. Each support plate has a pair of support holes. Opposite ends of a pair of element gears are rotatably supported in the support holes of the corresponding pair of support plates. The support plates are inserted into the housing together with the assembled differential gear mechanism along the axis of a tubular portion of the housing. When it is desired to exchange the support plates, the whole of the differential gear mechanism must be removed from the housing.

SUMMARY OF THE INVENTION

It is an object of this invention to provide a differential device in which the ratio of distribution of the drive torque to a pair of shafts can be easily changed or adjusted even after assembling the differential device.

According to the present invention, there is provided a differential device for use in a vehicle, comprising:

(a) a tubular housing for receiving a drive torque from a power source of the vehicle so as to be rotated, at least one opening being formed through a peripheral wall of the housing, the opening having a pair of opposed ends spaced from each other in a direction of the periphery of the housing, the housing having a pair of opposed flat receiving surfaces respectively defining the pair of opposed ends of the opening, a pair of support hole being formed in each of the pair of opposed receiving surfaces and extending perpendicular thereto, the pair of support holes being spaced from each other in a direction of the axis of the housing, and the pair of support holes in one of the pair of receiving surface being aligned respectively with the pair of support holes in the other receiving surface;

(b) a pair of shafts operatively connectable respectively to wheels of the vehicle, the pair of shafts extending into the housing and being opposed to each other at their one ends within the housing, and axes of rotation of the shafts being in alignment with the axis of rotation of the housing;

(c) a pair of side gears connected respectively to the one ends of the shafts for rotation therewith, each of the side gears having a screw gear portion at an outer periphery thereof;

(d) at least one pair of journal pins, opposite ends of each of the journal pins being received respectively in a corresponding pair of the aligned support holes, so that the journal pin is removably supported on the housing, each of the journal pins being disposed perpendicular to the axis of rotation of the housing;

(e) at least one pair of element gears received in the opening, each of the element gears having a through holes extending axially therethrough, each of the journal pin being inserted through the through hole of a respective one of the element gears, so that the element gear is supported by the journal pin for rotation about the journal pin, each of the element gears having a screw gear portion and a coupling gear portion, the screw gear portions of the element gears being in mesh with the screw gear portions of the side gears, respectively, and the coupling gear portions of the element gears being in mesh with each other; and (f) at least one washer means for adjusting the friction between the element gear and the housing, the washer means being interposed at least between one end face of one of the element gears and the receiving surface of the housing disposed in opposed relation to the one end face of the one element gear, and the washer means being mounted around the journal pin inserted through the through hole of the one element gear.

DESCRIPTION OF THE PREFERRED EMBODIMENT OF THE INVENTION

The invention will now be described with reference to the drawings.

Figure 1:
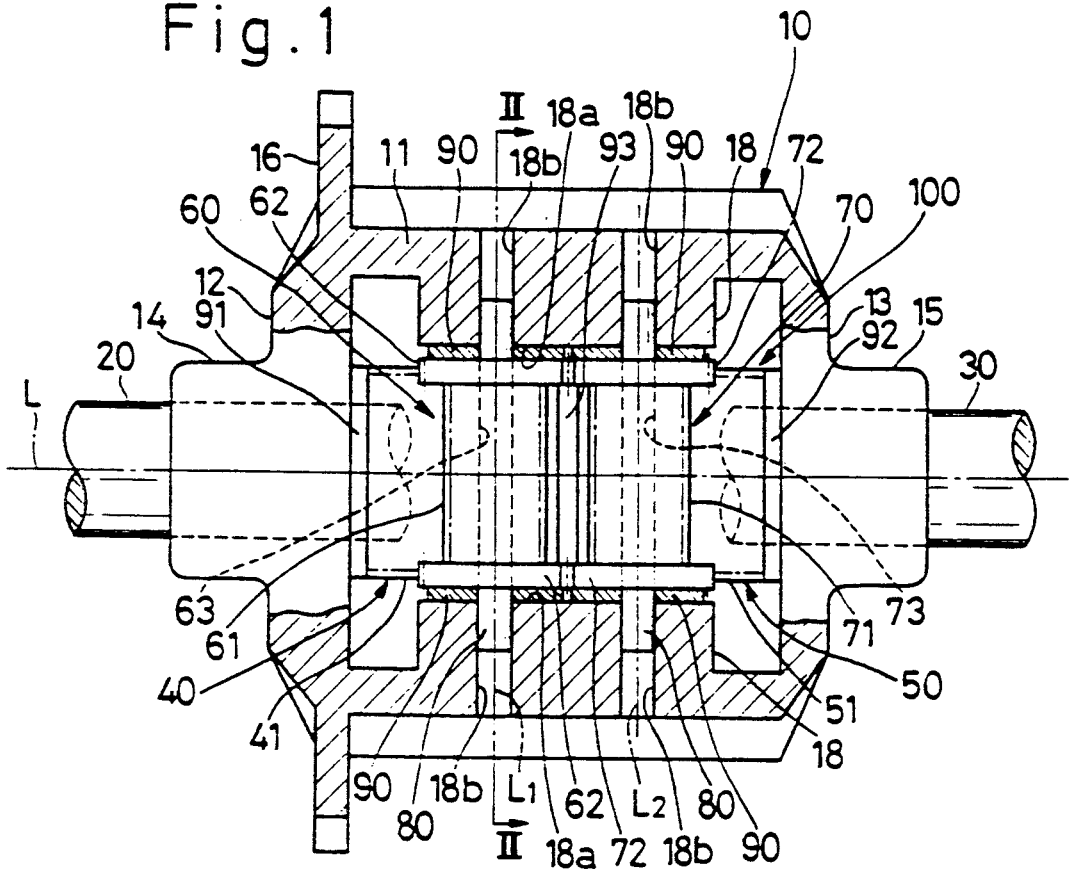
FIG. 1 is a cross-sectional view of a differential device of the present invention taken along the line I—I of FIG. 2.
Figure 2:
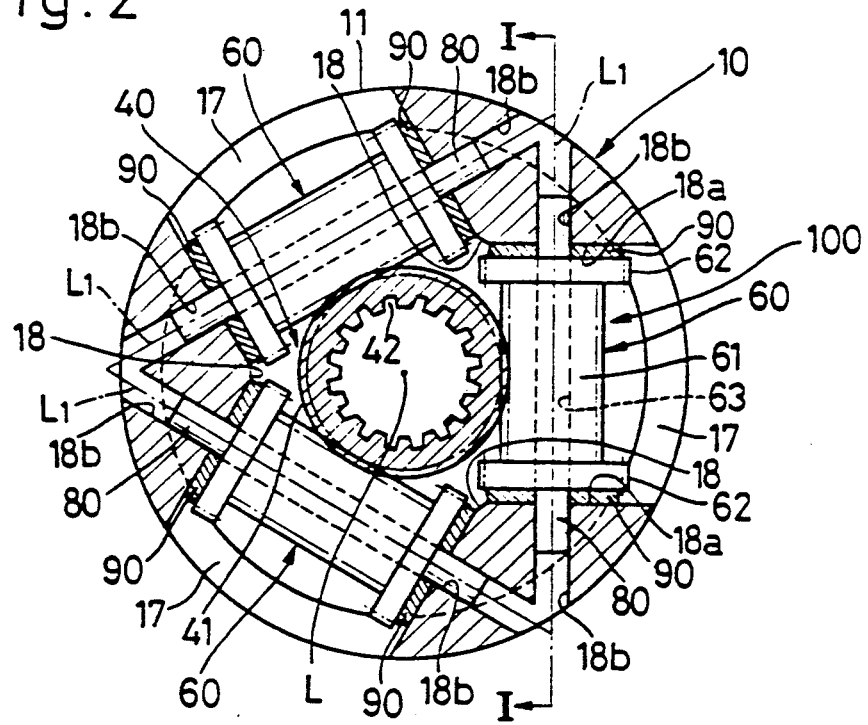
FIG. 2 is a cross-sectional view taken along the line II—II of FIG. 1.
Figure 3:
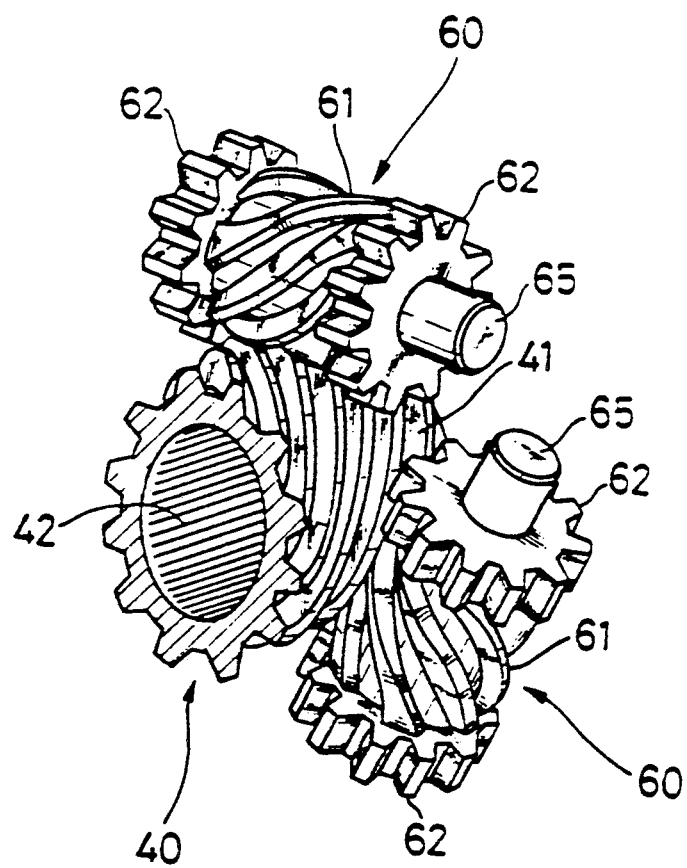
FIG. 3 is a perspective view, showing the intermeshing between one side gear and element gears.

FIGS. 1 to 3 show a differential device which can be used as a rear differential device or a front differential device. This device comprises a housing 10. As shown in FIG. 1, the housing 10 includes a tubular portion 11, a pair of end walls 12 and 13 formed respectively on the opposite ends of the tubular portion 11, and a pair of auxiliary tubular portions 14 and 15 extending outwardly respectively from the end walls 12 and 13 in the axial direction of the housing 10. The auxiliary tubular portions 14 and 15 are rotatably supported on a vehicle body via bearings (not shown) mounted around the auxiliary tubular portions 14 and 15. Reference character L in the drawings denotes the axis of rotation of the housing 10.

A radially outwardly-directed flange 16 is formed on the end wall 12. A crown gear (not shown) is fixedly secured to the flange 16, and a pinion, connected to an output shaft of a transmission or a shaft connected to this output shaft, is in mesh with this crown gear. With this arrangement, a drive torque from an engine (power source) is transmitted to the housing 10 via a clutch and the transmission.

A pair of shafts 20 and 30 extend respectively through the auxiliary tubular portions 14 and 15 of the housing 10, and are rotatably supported respectively by bearings (not shown) mounted respectively within the auxiliary tubular portions 14 and 15. The axes of rotation of the shafts 20 and 30 are in alignment with the axis L of rotation of the housing 10. The inner end portions of the shafts 20 and 30 are disposed within the housing 10, and have splines (not shown) formed on the outer peripheries thereof. The outer ends of the shafts 20 and 30 are operatively connected to a left wheel and a right wheel, respectively.

A differential gear mechanism 100 for transmitting the drive torque of the housing to the shafts 20 and 30 is mounted within the housing 10. This mechanism will now be described in detail.

A pair of hollow cylindrical side gears 40 and 50 of substantially the same configuration are spline-connected respectively to the inner end portions of the shafts 20 and 30. With this arrangement, the transmission of rotation between the shaft 20 and the side gear 40 as well as the transmission of rotation between the shaft 30 and the side gear 50 can be achieved.

Splines for the above spline-connection are formed on the inner periphery of each of the side gears 40 and 50 to provide a spline portion (only a spline portion 42 of the side gear 40 is shown in FIGS. 2 and 3). Screw gear portions 41 and 51 are formed on the outer peripheries of the side gears 40 and 50, respectively. The teeth of these screw gear portions 41 and 51 are omitted in FIGS. 1 and 2, and only the teeth of the screw gear portion 41 is shown in FIG. 3.

A washer 91 is interposed between the end wall 12 of the housing 10 and one end of the side gear 40, and a washer 92 is interposed between the end wall 13 of the housing 10 and one end of the side gear 50. A washer 93 is interposed between the other ends of the side gears 40 and 50. The washer 93 is fitted on and supported by a projection (not shown) extending axially from the other end of one of the two side gears 40 and 50.

The differential gear mechanism 100 further comprises three pairs of element gears 60 and 70. These element gears 60 and 70 are supported on the housing 10 in the following manner.

As shown in FIG. 2, three openings 17 are formed through the peripheral wall of the housing 10, and are spaced from one another at equal intervals in the circumferential direction of the tubular portion 11. Each opening 17 has a rectangular shape as viewed from the exterior of the tubular portion 11. The housing 10 has three projections 18 projecting radially inwardly therefrom. Each projection 18 is disposed between respective two adjacent ones of the openings 17. As shown in FIG. 2, the projection 18 has a generally triangular cross-section, and has two flat receiving surfaces 18a. The opposed ends of each opening 17 spaced from each other circumferentially of the tubular portion 11 are defined respectively by the opposed receiving surfaces 18a of the two adjacent projections 18. A pair of support holes 18b are formed in each receiving surfaces 18a, and extend perpendicular thereto, the pair of support holes 18b being spaced from each other in the direction of the axis of the housing 10. The pair of support holes 18b in one of the opposed receiving surfaces 18a are aligned respectively with the pair of support holes 18b in the other receiving surface 18a.

Each pair of element gears 60 and 70 are received in a respective one of the three openings 17, and the opposite end faces of each of the element gears 60 and 70 are opposed respectively to the opposed receiving surfaces 18a. The element gears 60 and 70 have respective through holes 63 and 73 formed axially therethrough, and journal pins 80 are passed through the through holes 63 and 73, respectively. The opposite ends of the journal pin 80 projecting respectively from the opposite end faces of the element gear 60, 70 are received respectively in the aligned support holes 18b formed respectively in the opposed receiving surfaces 18a. With this arrangement, the element gears 60 and 70 are rotatably supported on the housing 10. The axes L1 and L2 of rotation of the element gears 60 and 70 perpendicularly intersect the axis L of rotation of the housing 10.

A narrow retainer pin (not shown) is held against one end faces of the two journal pins 80 passed respectively through each pair of element gears 60 and 70, and another narrow retainer pin (not shown) is held against the other end faces of these two journal pins 80, these retainer pins extending through the housing 11 in a direction perpendicular to the support hole 18b. Thus, each journal pin 80 is prevented by these retainer pins from becoming disengaged from the housing 10.

Each element gear 60 has a screw gear portion 61, and a pair of spur gear portions (coupling gear portions) 62 formed respectively on the opposite ends of the screw gear portion 61 and having a diameter greater than the diameter of the screw gear portion 61. Similarly, each element gear 70 has a screw gear portion 71, and a pair of spur gear portions (coupling gear portions) 72 formed respectively on the opposite ends of the screw gear portion 71 and having a diameter greater than the diameter of the screw gear portion 71. The teeth of the screw gear portions 61 and 71 and the teeth of the spur gear portions 62 and 72 are omitted in FIGS. 1 and 2, and only the teeth of the screw gear portion 61 of the element gear 60, as well as the teeth of the spur gear portions 62, are shown in FIG. 3.

In the supported condition of each element gear 60 (70), its screw gear portion 61 (71) is in mesh with the screw gear portion 41 (51) of the side gear 40 (50). Therefore, the three element gears 60 are arranged at equal intervals around the side gear 40 in meshing relation thereto. Similarly, the three element gears 70 are arranged at equal intervals around the side gear 50 in meshing relation thereto. The spur gear portions 62 and 72 of each pair of element gears 60 and 70 are in mesh with each other. The differential gear mechanism 100 is constituted by such meshing arrangement.

A washer 90 is interposed between each of the opposite flat end faces of each of the element gears 60 and 70 and the receiving surface 18a of the housing 10 opposed to this flat end face. The washer 90 comprises a ring-shaped flat plate, and is fitted on and supported by the mating journal pin 80. The washer 90 is supported only by its mating journal pin 80, and is independent of the other journal pins 80.

The openings 17 in the housing 10 are used for accommodating the component parts of the differential gear mechanism 100 and for removing these component parts from the housing 10. For this reason, the opening 17 is greater in size than the side gears 40 and 50, and also has such a size that the pair of element gears 60 and 70 can be inserted into and removed from the housing 10 simultaneously.

A general operation of the differential device of the above construction will first be described. The drive torque is transmitted from the engine to the housing 10, and is further transmitted from the housing 10 to the shafts 20 and 30 via the differential gear mechanism 100.

When the vehicle is running or advancing straight without being subjected to a slip, the differential gear mechanism 100 is in a non-differential condition in which the element gears 60 and 70 are not rotated relative to the housing 10.

When the vehicle runs along a curved path or road, the differential gear mechanism 100 is operated to rotate the element gears 60 and 70, thereby absorbing a difference between the rotational speeds of the shafts 20 and 30.

In the above non-differential condition, when the drive torques applied respectively to the right and left wheels are less than the critical values (determined by the surface resistance) causing a slip, the drive torques distributed from the housing 10 respectively to the shafts 20 and 30 are equal to each other.

When the surface resistance at the right wheel is different from the surface resistance at the left wheel, and when the drive torque transmitted to one of the right and left wheels reaches the slip critical value, the drive torque distribution ratio is varied. Since the mechanism of the variation of the drive torque distribution ratio is well known in the art, this will now be briefly described. The differential function of the differential device is limited by the friction between the screw gear portions 61 of the element gears 60 and the screw gear portion 41 of the side gear 40, the friction between the screw gear portions 71 of the element gears 70 and the screw gear portion 51 of the side gear 50, the friction between the housing 10 and the side gears 40 and 50 via the washers 91 and 92, the friction between the side gears 40 and 50 via the washer 93, and the friction between the housing 10 and the element gears 60 and 70 via the washers 90. As a result, the ratio of distribution of the torque to the shafts 20 and 30 is varied. Namely, the drive torque applied to the shaft connected to the wheel subjected to a greater surface resistance is increased while keeping the drive torque, applied to the shaft connected to the wheel subjected to a smaller surface resistance, at the slip critical value. Therefore, the drive torque can be effectively transmitted from the engine to the wheels without causing a slip.

Since the drive torque distribution depends on the above frictions, the maximum drive torque distribution ratio is determined by the frictions occurring at all the friction-producing portions.

When the maximum value of the above drive torque distribution ratio is to be changed or adjusted after assembling the differential device, this can be achieved by exchanging the washers 90, interposed between the housing 10 and the element gears 60 and 70, with new washers. The surface condition of the new washer is different from the surface condition of the original washer to be replaced, and serves to vary the magnitude of the friction between the housing 10 and the element gear 60 (70) via the new washer.

The replacement of the washers 90 will now be described, taking, as an example, the washers 90 disposed on the opposite ends of the element gear 60. One of the retainer pins provided respectively at the opposite ends of the journal pin 80 is removed, and the journal pin 80 is moved in its axial direction, and is removed from the element gear 60 and the housing 10. Then, the washer 90 which has been interposed between each end face of the element gear 60 and the mating receiving surface 18a of the housing 10 is removed and is replaced by a new washer. Then, the journal pin 80 is inserted into the support holes 18b and the through hole 63 of the element gear 60, and is retained by the retainer pins.

At this time, the washers 90 can be replaced by the new washers, with the element gear 60 kept received in the housing 10 in meshing engagement with the side gear 40. Also, the element gear 60 may be removed from the housing 10 together with the washers 90, and then may be received in the housing together with the new washers.

Also, the journal pin 80 may be axially moved in such a manner that one end of the journal pin 80 is disengaged from the support hole 18b and is retained in the through hole 63 of the element gear 60, in which case only one washer 90 can be replaced by the new washer.

The washers 90 disposed respectively at the opposite ends of each element gear 70 are replaced in the same manner as described above for the element gear 60.

As described above, the washers 90 can be easily exchanged merely by moving the journal pin 80 axially, and at the time of exchange of the washers 90, the shafts 20 and 30 and the side gears 40 and 50 do not need to be removed from the housing 10. Therefore, even after assembling the differential device, the maximum value of the drive torque distribution ratio can be easily varied or adjusted.

The present invention is not restricted by the above embodiment, and various modifications can be made. For example, each spur gear portion of the element gear constituting the coupling gear portion may be replaced by a helical gear portion. The coupling gear portions of the pair of element gears may be engaged with each other via respective idle gears.

One of the two aligned support holes respectively supporting the opposite ends of the journal pin may not extend through the wall of the housing.

The washer may be provided between one end of each element gear and the housing, and the washer may not be provided between the other end and the housing. Also, the washer(s) may be provided between one or both ends of one or some of the element gears and the housing, and the washers may not be provided between the other element gears and the housing. Further, more than one washer may be provided between the end of the element gear and the housing.

The washer interposed between the element gear and the housing may be so designed as to provide the friction either greater or smaller than the friction produced by direct contact between the element gear and the housing.

The present invention is applicable to a center differential device.

What is claimed is:

1. A differential device for use in a vehicle, comprising:

(a) a tubular housing for receiving a drive torque from a power source of the vehicle so as to be rotated, a plurality of openings being formed through a peripheral wall of said housing, said openings being spaced from each other in a direction of the periphery of said housing, each of said openings being defined by a pair of opposed flat receiving surfaces spaced from each other in the direction of the periphery of said housing, a pair of support holes being formed in each of said pair of opposed receiving surfaces and extending perpendicular thereto, said pair of support holes being spaced from each other in a direction of the axis of said housing, and one of said pair of support holes in one of said pair of receiving surfaces being aligned respectively with the other of said pair of support holes in the other of said pair of receiving surfaces;

(b) a pair of shafts operatively connectable respectively to wheels of the vehicle, said pair of shafts extending into said housing and being opposed to each other at one end within said housing, and the axes of rotation of said shafts being in alignment with the axis of rotation of said housing;

(c) a pair of side gears connected respectively to said one end of each of said shafts for rotation therewith, each of said side gears having a screw gear portion at an outer periphery thereof;

(d) a plurality of pairs of journal pins, each pair of journal pins disposed in a corresponding one of said openings, the opposite ends of each of said journal pins being received respectively in a corresponding pair of said aligned support holes, so that each of said journal pins is supported on said housing, each of said journal pins being removable from said housing in a direction of an axis of said each of said journal pins and being disposed perpendicular to the axis of rotation of said housing;

(e) a plurality of pairs of element gears, each pair of said element gears being received in a corresponding one of said openings, each of said element gears having a through hole extending axially therethrough, said journal pins being inserted through said through holes of said element gears, respectively, so that said element gears are supported by said journal pins for rotation about said journal pins, each of said element gears having a screw gear portion and a coupling gear portion, said screw gear portions of each pair of said element gears being in mesh with said screw gear portions of said side gears, respectively, and said coupling gear portions of each pair of said element gears being in mesh with each other; and (f) a plurality of pairs of washers for adjusting the friction between said element gears and said housing, each of said washers being made solely of a ring-shaped flat plate, each pair of said washers being interposed between opposite end faces of each corresponding one of said element gears and said receiving surfaces, respectively, and each of said washers being mounted around and supported only by the corresponding one of said journal pins and being independent of the other journal pins.

* * * * *